(12) United States Patent
Kim et al.

(10) Patent No.: US 12,127,549 B2
(45) Date of Patent: Oct. 29, 2024

(54) ULTRASOUND GENERATOR, PEST EXTERMINATION SYSTEM USING ULTRASOUND GENERATOR AND METHOD OF CONTROLLING ULTRASOUND GENERATOR

(71) Applicants: Hyundai Motor Company, Seoul (KR); Kia Corporation, Seoul (KR)

(72) Inventors: Ki Chang Kim, Suwon-si (KR); Dong Chul Park, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 40 days.

(21) Appl. No.: 17/986,447

(22) Filed: Nov. 14, 2022

(65) Prior Publication Data

US 2023/0380408 A1 Nov. 30, 2023

(30) Foreign Application Priority Data

May 24, 2022 (KR) .......................... 10-2022-0063518

(51) Int. Cl.
*A01M 29/18* (2011.01)
*G10K 15/02* (2006.01)

(52) U.S. Cl.
CPC ............. *A01M 29/18* (2013.01); *G10K 15/02* (2013.01); *A01M 2200/012* (2013.01)

(58) Field of Classification Search
CPC .. A01M 29/18; A01M 2200/012; G10K 15/02
See application file for complete search history.

(56) References Cited

U.S. PATENT DOCUMENTS

| | | | | |
|---|---|---|---|---|
| 4,346,370 A | * | 8/1982 | Carter | B06B 1/0284 340/384.2 |
| 4,618,948 A | * | 10/1986 | Sakakibara | G01S 15/931 340/904 |
| 5,602,523 A | * | 2/1997 | Turchioe | G08B 3/10 340/384.1 |
| 5,889,870 A | * | 3/1999 | Norris | H04S 1/002 381/79 |

(Continued)

FOREIGN PATENT DOCUMENTS

| | | |
|---|---|---|
| KR | 20-1993-0007956 U | 5/1993 |
| KR | 20-0201026 Y1 | 11/2000 |

(Continued)

*Primary Examiner* — John A Tweel, Jr.
(74) *Attorney, Agent, or Firm* — Banner & Witcoff, Ltd.

(57) ABSTRACT

Disclosed are an ultrasound generator, a pest extermination and repellent system using the ultrasound generator, and a method of controlling the ultrasound generator. The ultrasound generator may include a driving signal generator that generates a driving signal, a modulator that generates a modulated signal by modulating an amplitude of the driving signal, a first ultrasonic vibrator that generates a first ultrasonic signal of a first frequency based on the modulated signal, a second ultrasonic vibrator that generates a second ultrasonic signal of a second frequency based on the modulated signal, and a controller that adjusts an output timing of the modulated signal to output the first ultrasonic signal and the second ultrasonic signal at least once during a unit time period.

17 Claims, 19 Drawing Sheets

(56) References Cited

U.S. PATENT DOCUMENTS

| | | | | | |
|---|---|---|---|---|---|
| 6,476,711 | B2* | 11/2002 | Kitamura | ............... | G10K 15/02 |
| | | | | | 340/384.1 |
| 7,564,981 | B2* | 7/2009 | Croft, III | ............... | G10K 15/02 |
| | | | | | 367/137 |
| 8,027,488 | B2* | 9/2011 | Pompei | ............... | H04R 3/12 |
| | | | | | 381/112 |
| 8,379,902 | B2* | 2/2013 | Koseki | ............... | H04R 1/323 |
| | | | | | 381/387 |
| 8,891,783 | B2* | 11/2014 | Tan | ............... | H04R 1/403 |
| | | | | | 381/103 |
| 2015/0084751 | A1 | 3/2015 | Crawford | | |
| 2021/0229106 | A1* | 7/2021 | Meegoda | ............... | B09C 1/06 |

FOREIGN PATENT DOCUMENTS

| KR | 10-2006-0026160 A | 3/2006 |
|---|---|---|
| KR | 10-0818364 B1 | 4/2008 |
| KR | 10-2008-0099599 A | 11/2008 |
| KR | 10-2018-0011471 A | 2/2018 |
| KR | 20-0490387 Y1 | 11/2019 |
| KR | 10-2022-0013805 A | 2/2022 |
| KR | 10-2022-0085062 A | 6/2022 |

* cited by examiner

ULTRASOUND GENERATOR, PEST EXTERMINATION SYSTEM USING ULTRASOUND GENERATOR AND METHOD OF CONTROLLING ULTRASOUND GENERATOR

CROSS-REFERENCE TO RELATED APPLICATION

This application claims the benefit of priority to Korean Patent Application No. 10-2022-0063518, filed in the Korean Intellectual Property Office on May 24, 2022, the entire contents of which are incorporated herein by reference.

TECHNICAL FIELD

The present disclosure relates to an ultrasound generator, a pest extermination or repellent system using the ultrasound generator, and a method of controlling the ultrasound generator, and more particularly, to a technology capable of effectively exterminating or repelling mosquitoes corresponding to the types of mosquitoes.

BACKGROUND

Techniques for exterminating or repelling pests using natural frequencies that pests do not like have been proposed. For example, a mosquito extermination or repellent scheme for exterminating or repelling mosquitoes by using ultrasound having a specific frequency has also been proposed.
However, according to conventional schemes of exterminating or repelling mosquitoes by using ultrasound, because the frequency of the output ultrasound is fixed, there is a limit to the mosquito extermination or repellent performance. For this reason, the use of the mosquito extermination or repellent device using ultrasound is limited.

SUMMARY

The present disclosure has been made to solve the above-mentioned problems occurring in the prior art while advantages achieved by the prior art are maintained intact.

An aspect of the present disclosure provides an ultrasound generator capable of exterminating mosquitoes over a wider area, a pest extermination system using the ultrasound generator, and a method of controlling the ultrasound generator.

Another aspect of the present disclosure provides an ultrasound generator capable of covering a wide area without degrading mosquito extermination performance, a pest extermination system using the ultrasound generator, and a method of controlling the ultrasound generator.

Still another aspect of the present disclosure provides an ultrasound generator capable of exterminating various types of mosquitoes, a pest extermination system using the ultrasound generator, and a method of controlling the ultrasound generator.

The technical problems to be solved by the present disclosure are not limited to the aforementioned problems, and any other technical problems not mentioned herein will be clearly understood from the following description by those skilled in the art to which the present disclosure pertains.

An ultrasound generator may include a driving signal generator that generates a driving signal, a modulator that generates a modulated signal by modulating an amplitude of the driving signal, a first ultrasonic vibrator that generates a first ultrasonic signal, having a first frequency, based on the modulated signal, a second ultrasonic vibrator that generates a second ultrasonic signal, having a second frequency, based on the modulated signal, and a controller that adjusts an output timing of the modulated signal to output the first ultrasonic signal and the second ultrasonic signal at least once during a unit time period.

The modulator may generate the modulated signal via at least one of single sideband modulation or double sideband modulation.

The first frequency and the second frequency may be set so that the first ultrasonic signal and the second ultrasonic signal repel different types of pests.

The controller may determine a type of mosquito infestation based on location information, and adjust the output timing of the modulated signal to output an ultrasonic signal having a frequency for repelling the determined type of mosquito infestation.

The controller may adjust the output timing of the modulated signal based on a machine learning process using, as input values, location information and a type of mosquito infestation.

The controller may control the ultrasonic vibrator to prevent, during the unit time period, an output time period of the first ultrasonic signal of the first frequency from overlapping with an output time period of the second ultrasonic signal of the second frequency.

The controller may adjust the output timing of the modulated signal to sweep between the first frequency and the second frequency during the unit time period.

The controller may adjust the output timing of the modulated signal to output the first ultrasonic signal and the second ultrasonic signal to sweep between the first frequency and the second frequency during the unit time period while alternately outputting the first frequency and the second frequency.

The first ultrasonic vibrator and the second ultrasonic vibrator may be implemented in a super directional speaker.

The ultrasound generator may further include a housing to which the first ultrasonic vibrator and the second ultrasonic vibrator are coupled, and a motor that rotates the housing.

The ultrasound generator may further include a main frame that supports the housing, and a support protruding from the main frame to be seated in a cup holder of a vehicle.

The ultrasound generator may further include an amplifier that amplifies amplitudes of the modulated signals.

A pest extermination or repellent system may include a first ultrasonic vibrator that generates a first ultrasonic signal having a first frequency during a unit time period; a second ultrasonic vibrator that generates a second ultrasonic signal having a second frequency during the unit time period; a controller that controls output timings of the first ultrasonic signal and the second ultrasonic signal output from the first ultrasonic vibrator and the second ultrasonic vibrator; and a speaker that is coupled to a vehicle to transmit a sound signal having a preset audible frequency while the first ultrasonic vibrator and the second ultrasonic vibrator output the first ultrasonic signal and the second ultrasonic signal under control of the controller.

The first ultrasonic vibrator and the second ultrasonic vibrator may be implemented in a super directional speaker.

The pest extermination or repellent system may further include a housing to which the first ultrasonic vibrator and the second ultrasonic vibrator are coupled, and a motor that rotates the housing.

The pest extermination or repellent system may further include a main frame that supports the housing, and a support that protrudes from the main frame to be seated in a cup holder of the vehicle.

The controller may control the output timings of the first ultrasonic signal and the second ultrasonic signal to exterminate or repel pests based on location information associated with the vehicle.

A method of controlling an ultrasound generator may include, generating modulated signals by modulating driving signals having different frequencies, adjusting output timings of the modulated signals to include an output time period of each of the driving signals at least once during a unit time period, and generating ultrasound based on the modulated signals and based on the output timings.

Generating the modulated signals may include using at least one of single sideband modulation and double sideband modulation.

Adjusting the output timings of the modulated signals may include adjusting the output timings of the modulated signals to sweep between the first frequency and the second frequency during the unit time period while alternately outputting the first frequency and the second frequency.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
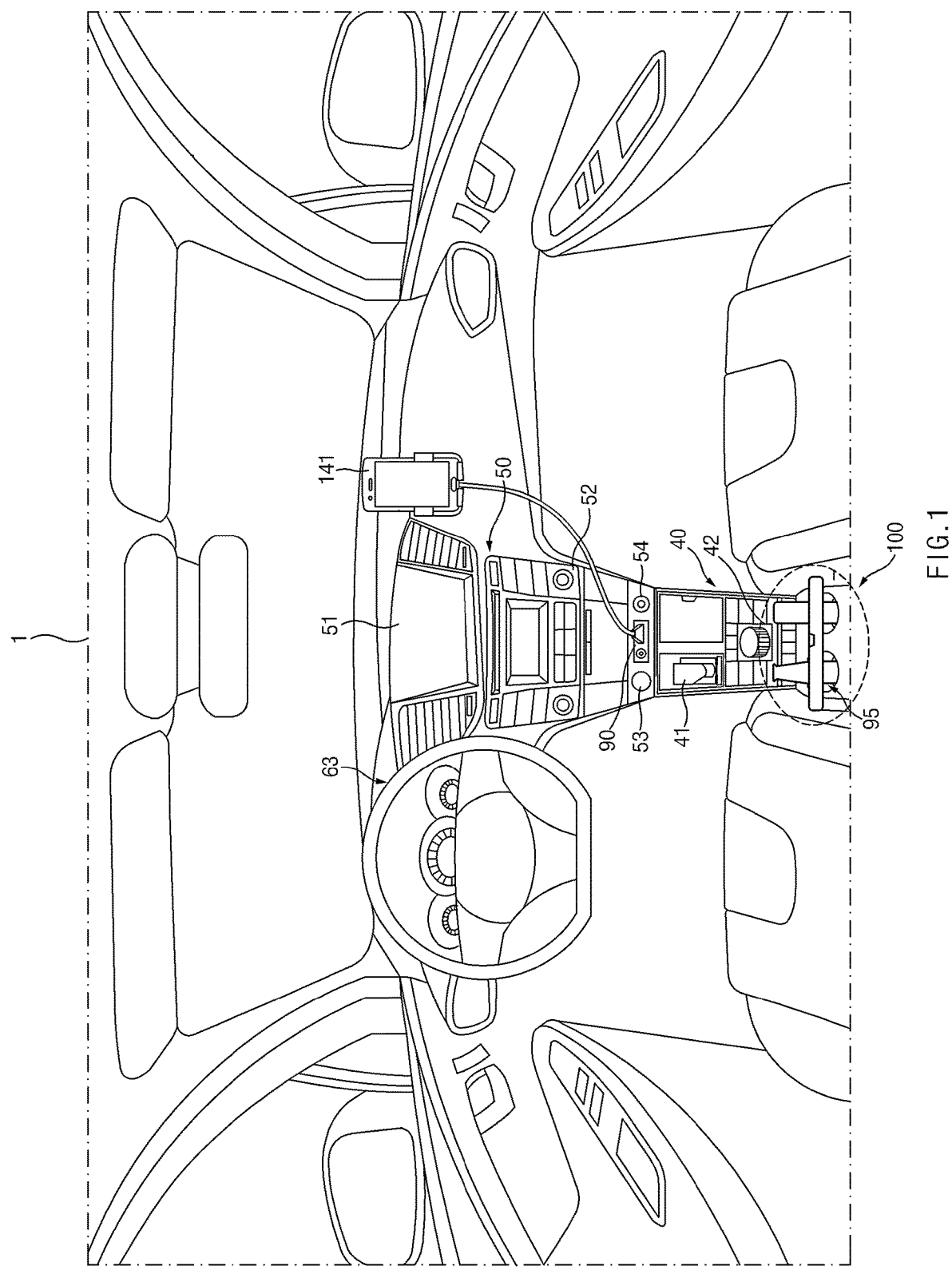
FIG. 1 is a diagram illustrating an example ultrasound generator and an example pest extermination or repellent system using the same.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In some embodiments, a mosquito repellent area of a mosquito extermination or repellent device mounted on a vehicle may not cover the entire interior of the vehicle due to the linear propagation of ultrasound. In order to cover the entire interior area of the vehicle, a large number of ultrasonic vibrators may need to be installed. In particular, in recent years, vehicles are widely used for leisure activities especially in and around camp grounds. The mosquito extermination or repelling function may come in handy while campers engage in outdoor activities, but the performance of mosquito extermination or repelling may be deteriorated outdoors.

A mosquito extermination or repellent scheme using a single frequency of ultrasound may have a limit in the types of mosquitoes that can be exterminated or repelled.

Hereinafter, embodiments of the present disclosure will be described in detail with reference to FIGS. 1 to 16.

Figure 2:
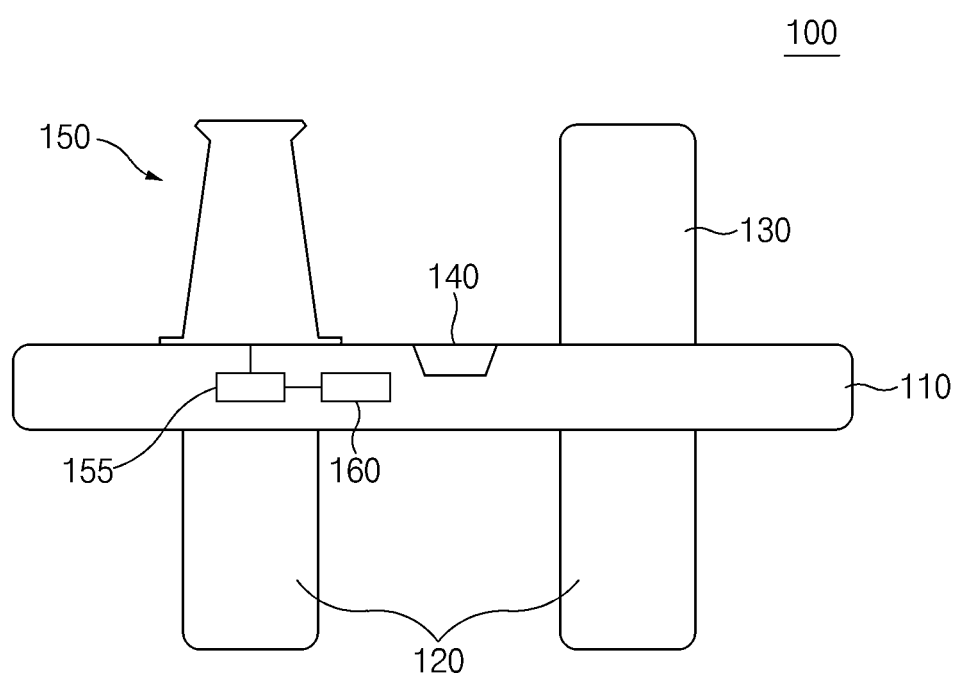
FIG. 2 is a diagram illustrating the example ultrasound generator shown in FIG. 1 from a different angle.
Figure 3:
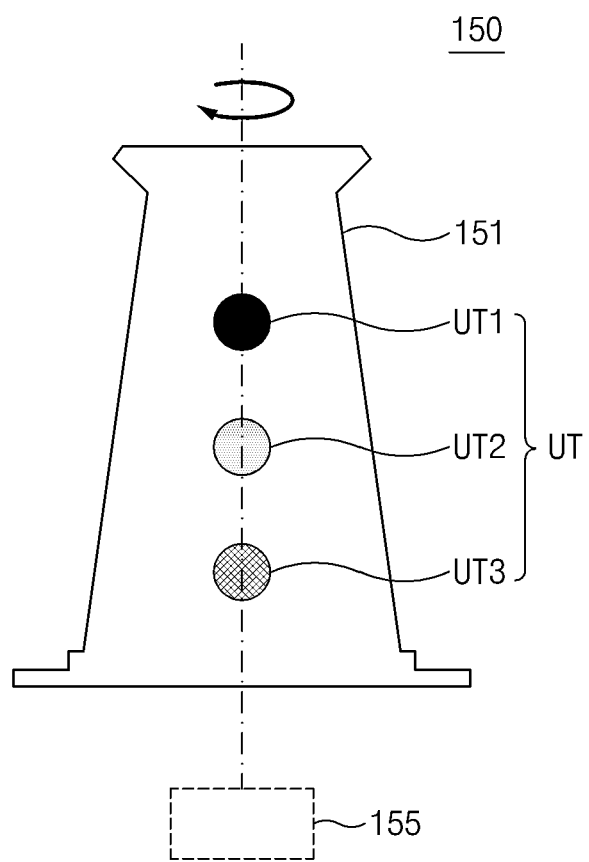
FIG. 3 is a diagram illustrating an example ultrasound transmitter.
Figure 4:
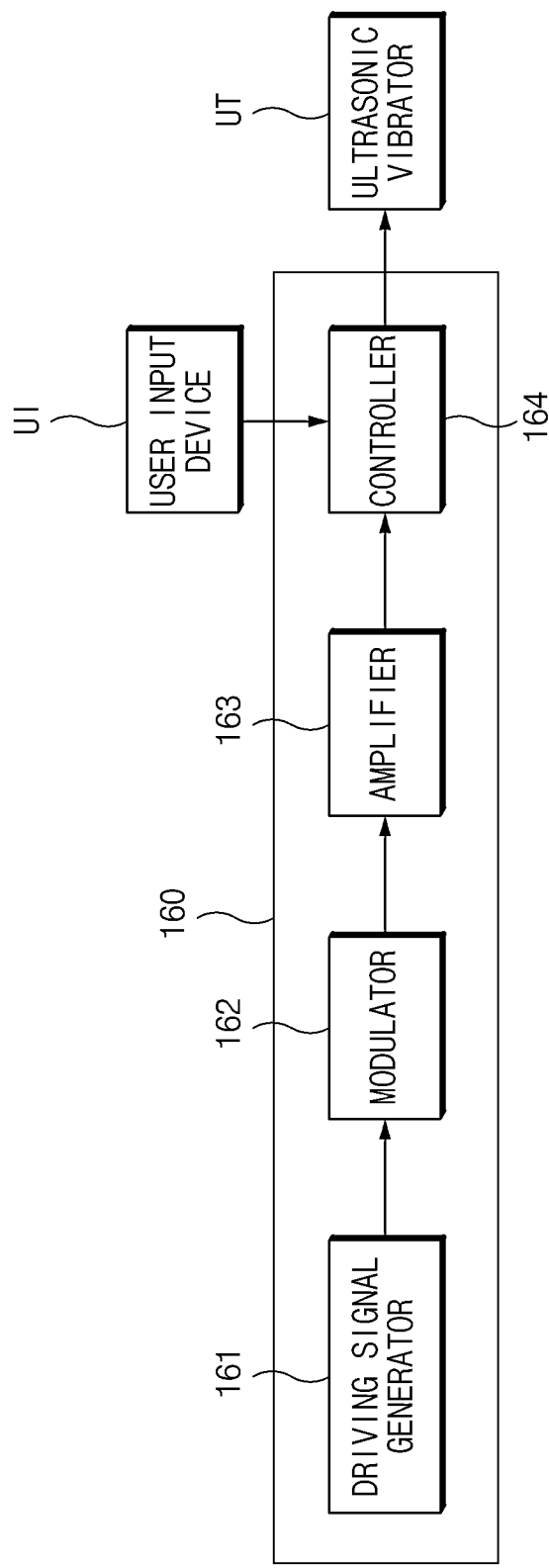
FIG. 4 is a block diagram illustrating a configuration of an example circuit.

FIG. 1 is a diagram illustrating an example ultrasound generator and an example pest extermination or repellent system using the same. FIG. 2 is a diagram illustrating the example ultrasound generator shown in FIG. 1 from a different angle. FIG. 3 is a diagram illustrating an example ultrasound transmitter. FIG. 4 is a block diagram illustrating a configuration of an example circuit.

Referring to FIG. 1, a vehicle 1 may include a dashboard provided with a gearbox 40, a center fascia 50, and a steering wheel 63.

The gearbox 40 may include a shift gear 41 for shifting a gear ratio of a vehicle. In addition, the gearbox 40 may provide a space in which a dial manipulation device 42 is installed, and a user may control a navigation device (e.g., located at a display 51) or main functions of the vehicle through the dial manipulation device 42.

The center fascia 50 may include an outlet, a clock, an audio device 52, a display 51, and the like.

The outlet may control the temperature, humidity, and cleanliness of the air inside the vehicle by sending the flow of air controlled by an air conditioner into the vehicle. The center fascia 50 may include a button 53 or a dial 54 for controlling the air conditioner.

The display 51 of the center fascia 50 may display various images output by an audio video navigation (AVN) device of the vehicle. The display 51 may be implemented with a liquid crystal display (LCD) panel, an organic light emitting diode (OLED) panel, or the like.

The steering wheel 63 may control wheels and further adjust the driving direction of the vehicle 1.

The dashboard may further include various gauges capable of displaying the driving speed of the vehicle, the engine rotational speed, the remaining fuel amount, and the like, and a glove box capable of accommodating various articles.

In addition, the center fascia 50 of the dashboard may be provided with a Universal Serial Bus (USB) port 90 for connecting the storage medium connection device to the AVN device of the vehicle 1 and the like.

The AVN device refers to a terminal that can provide a navigation function of providing a route to a destination to a user, and can also provide an audio and video function in an integrated manner. The AVN device may selectively display at least one of an audio screen, a video screen, and a navigation screen through the display 51, and may also display various control screens related to control of the vehicle 1 or a screen related to an additional function that can be executed in the AVN device.

The AVN device may be connected to a storage medium connection device through an USB port 90. The storage media may include a portable storage device such as an USB memory, a memory card (a smart media card (SMC)), a compact flash (CF) card, a memory stick, a secure digital (SD) card, a multimedia card (MMC), and the like. In addition, the storage medium connectable to a connection device may include an electronic device connected to a magnetic storage medium (e.g., a read-only memory (ROM), a floppy disk, a hard disk, and the like), an optical readable medium (e.g., a compact disc rom (CD-ROM), a digital video disc (DVD), and the like), and the above-mentioned portable storage medium. In this case, the electronic device may include a computer, a laptop computer, a digital camera, a smart phone, an MP3 player, a portable multimedia player (PMP), a game machine, and the like that can be connected to a magnetic storage medium, an optical readable medium, and a portable storage medium.

In addition, the vehicle 1 may further include a speaker capable of transmitting a multimedia sound source. The speaker may transmit a preset sound source to the user while an ultrasound generator 100 is operating.

Referring to FIG. 2, the ultrasound generator 100 may be implemented in the form of a portable multifunction device that can be placed in a cup holder 95 of the vehicle 1. The ultrasound generator 100 may be a super directional speaker capable of emitting a highly directional beam of ultrasound.

To this end, the ultrasound generator 100 may include a main frame 110, a support 120, a multi-device 130, and an ultrasound transmitter 150.

The main frame 110 may support the overall configuration of the ultrasound generator 100, and may provide a space in which a circuit 160 shown in FIG. 2 is mounted. To this end, the main frame 110 may be in the form of a box having a certain empty space therein, but the shape of the main frame 110 is not limited thereto. A power input device 140 for power input may be formed in a portion of the main frame 110, and the power input device 140 may be a USB socket.

The support 120, which is provided to be placed in the cup holder 95, may have a size suitable to be inserted into the cup holder 95. The lower ends of the support 120 may be formed flat such that the ultrasound generator 100 is advantageously used outside the vehicle 1.

The multi-device 130 may include one or more additional devices for user convenience. For example, the multi-device 130 may include at least one of additional devices such as a speaker, an air purifier, lighting, an auxiliary battery, and the like.

The speaker may transmit an emotional sound source (e.g., relaxing sound, ambient white noise, etc.) while the ultrasonic vibrator outputs ultrasound. The emotional sound source, which is a preset sound source having an audible frequency, may notify the user of the operation of an ultrasonic vibrator UT (e.g., ultrasonic transmitter).

The ultrasound transmitter 150 may include the ultrasonic vibrator UT, and a housing 151.

The ultrasonic vibrator UT may be coupled to the housing 151 to allow the ultrasonic transmission area to be exposed to the outside of the housing 151.

The ultrasonic vibrator UT may generate ultrasound based on the amplified signals provided from an amplifier 163.

The ultrasonic vibrator UT may include a plurality of ultrasonic vibrators UT1, UT2, and UT3 that transmit ultrasound of different frequencies. For example, the first ultrasonic vibrator UT1 may output first ultrasound having a first frequency, the second ultrasonic vibrator UT2 may output second ultrasound having a second frequency, and the third ultrasonic vibrator UT3 may output third ultrasound having a third frequency. One or more ultrasonic vibrators UT1, UT2, and UT3 may be implemented with a super directional speaker. A super directional speaker may be capable of emitting a highly directional beam of ultrasound.

Each of the first frequency, the second frequency, and the third frequency may be a frequency for exterminating or repelling pests such as mosquitoes. For example, the first frequency may be set to 30 Khz, the second frequency may be set to 60 Khz, and the third frequency may be set to 70 Khz.

The ultrasonic vibrator may be classified as a magnetostrictive vibrator or a piezoelectric vibrator according to a vibration generating principle.

The magnetostrictive vibrator may use a coil wound on a magnetic substance such as ferrite. The magnetostrictive vibrator may resonate with a natural frequency according to an applied current and generate ultrasound in a direction perpendicular to the magnetic field.

The piezoelectric vibrator may have a simple structure by using the piezoelectric effect that converts mechanical stress into electric charge. The piezoelectric body may generate a longitudinal wave or a shear wave depending on the cut shape. After the piezoelectric body is polarized, when an alternating current (AC) voltage is applied, expansion and contraction may be repeated. The piezoelectric vibrator may output ultrasound based on the vibration of the piezoelectric body.

A motor 155 for rotating the housing 151 may be included in the housing 151. As the housing 151 is rotated by the motor 155, mosquito extermination or repelling may be achieved in all areas in the rotational direction by using the ultrasonic vibrators UT1, UT2 and UT3 located on one surface of the housing 151.

The circuit 160 may be included in the housing 151 or in the main frame 110 as shown in FIG. 4.

The circuit 160 may include a driving signal generator 161, a modulator 162, the amplifier 163, and a controller 164.

The driving signal generator 161 may generate a driving signal for driving the ultrasonic vibrator UT. The driving signal generator 161 may use an oscillator or the like.

The modulator 162 may generate a modulated signal by modulating the amplitude of the driving signal. The modulator 162 may modulate the amplitude to adjust the parameters of the frequency carrier wave of the driving signal, thereby increasing the output efficiency of the ultrasonic vibrator UT. The modulator 162 may modulate the amplitude of the carrier wave according to the amplitude of the analog data. The modulator 162 may modulate the amplitude of the carrier wave according to a double side band (DSB), a single side band (SSB), a vestigial side band (VSB), or a hybrid scheme in which SSB and DSB are mixed.

Figure 5:
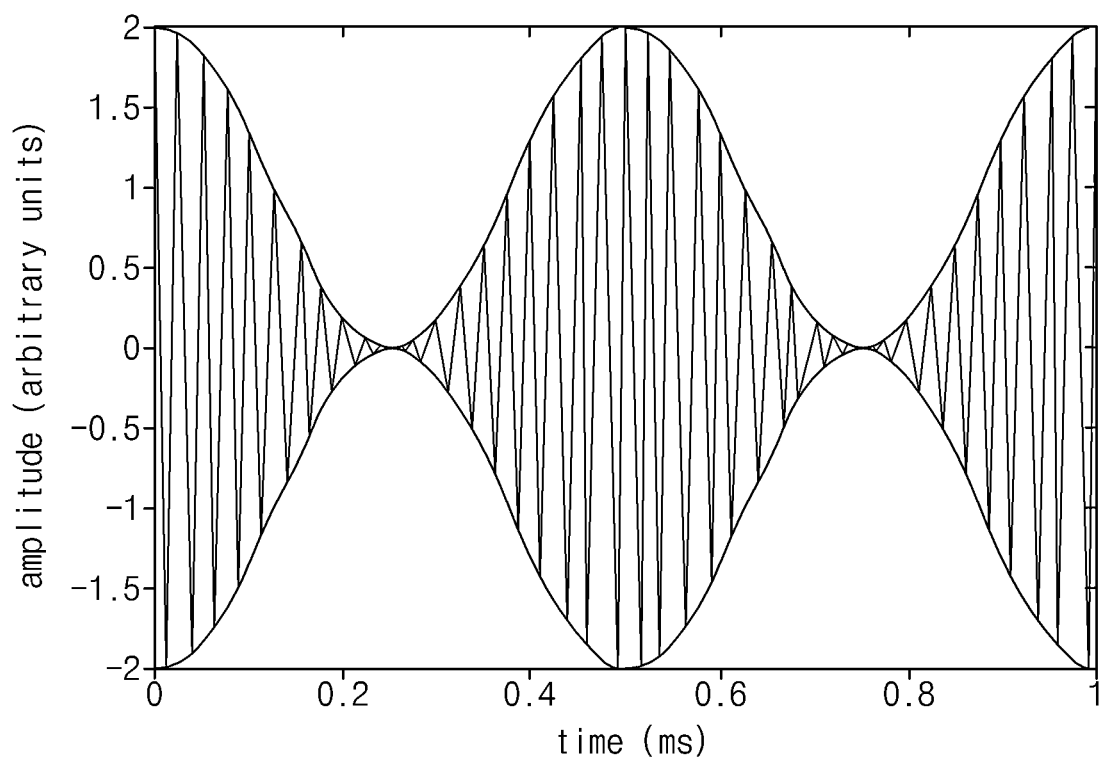
FIG. 5 is a diagram illustrating example double side band (DSB) modulation.

FIG. 5 is a diagram illustrating example double side band (DSB) modulation.

The modulator 162 may modulate the driving signal in the DSB scheme of simultaneously transmitting an upper sideband (USB) and a lower sideband (LSB) on a spectrum.

As the DSB scheme, a double side band-suppressed carrier (DSB-SC) scheme in which a carrier wave is not included in a modulated wave or a double side band-large carrier (DSB-LC) scheme in which a carrier wave is included in a modulated wave may be used.

Figure 6:
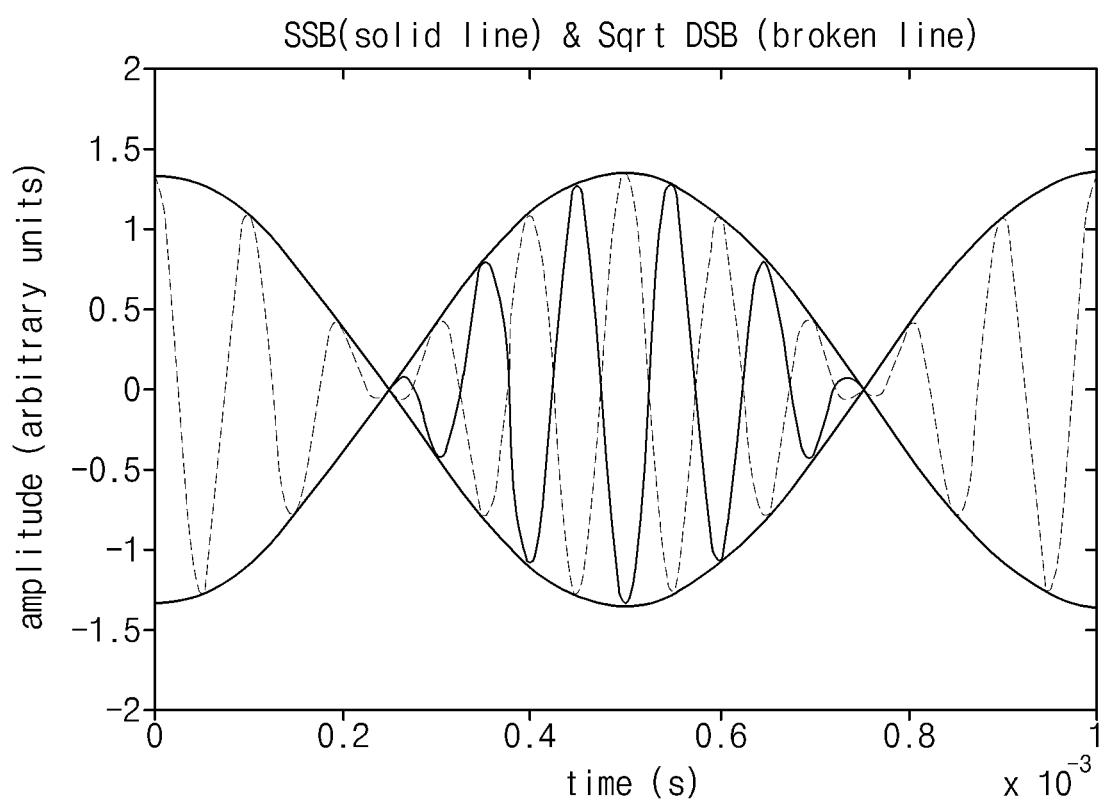
FIG. 6 is a diagram illustrating an example waveform obtained by mixing DSB modulation and SSB modulation.

FIG. 6 is a diagram illustrating an example waveform obtained by mixing DSB modulation and SSB modulation.

The modulator 162 may first modulate the driving signal in the SSB scheme, and then perform secondary modulation in the DSB scheme shown in FIG. 5 to generate the modulated signal obtained in the complex scheme as shown in FIG. 6.

The amplifier 163 may amplify the modulated signal output from the modulator 162. In addition, the amplifier 163 may provide the amplified modulated signal to the ultrasonic vibrators UT1, UT2 and UT3.

The controller 164 may determine the ultrasound output pattern by adjusting the output timings of the modulated signals. The controller 164 may adjust the output timings of the modulated signals such that the output time period of each modulated signal is included at least once within the unit time period.

In order to adjust the output timings of the modulated signals, the controller 164 may identify a type of mosquito corresponding to location information. The location information, which is information about the location of the ultrasound generator 100, may be obtained on a global positioning system (GPS). To this end, the ultrasound generator 100 may further include a GPS receiver or may obtain the location information from an external source.

The types of infestation mosquitoes corresponding to location information may be stored in advance in a database as shown in following Table 1.

TABLE 1

| GPS coordinates (x, y) | Types of mosquito infestation |
| --- | --- |
| (x1, y1) | Mosquito A, Mosquito B |
| (x2, y2) | Mosquito C |
| (x3, y3) | Mosquito D |
| ... | ... |

Referring to Table 1, in the database, a type of mosquito infestation may be matched to coordinates (e.g., range of coordinates denoting a region) denoted by latitude and longitude and stored.

In addition, the controller 164 may check the killing frequency matching the type of mosquito. To this end, the database may store killing frequency information corresponding to infestation mosquitoes as shown in Table 2. A killing frequency may be an ultrasonic frequency that is known to harm or repel a given type of mosquito.

TABLE 2

| Infestation mosquito | Killing frequency |
| --- | --- |
| Mosquito A | f1 |
| Mosquito B | f2 |
| Mosquito C | f3 |
| ... | ... |

As a result, the controller 164 may select a killing frequency corresponding to the location information and control the ultrasonic output to output the killing frequencies. For example, when the location information is (x1, y1), the controller 164 may select f1 and f2 as the killing frequencies, and when the location information is (x2, y2), the controller 164 may select f3 as the killing frequency.

If there is a killing frequency that is not supported by the ultrasound generator 100 among the killing frequencies corresponding to the location information, or a killing frequency for exterminating or repelling a type of mosquito infestation corresponding to the location information is not set (e.g., defined), the controller 164 may control the output timing of the ultrasonic signal in a sweep pattern of sweeping within a range of frequencies. The timing of the output of the ultrasonic signal may be controlled by adjusting the output timing of the modulated signal output by the modulator 162.

Figure 7:
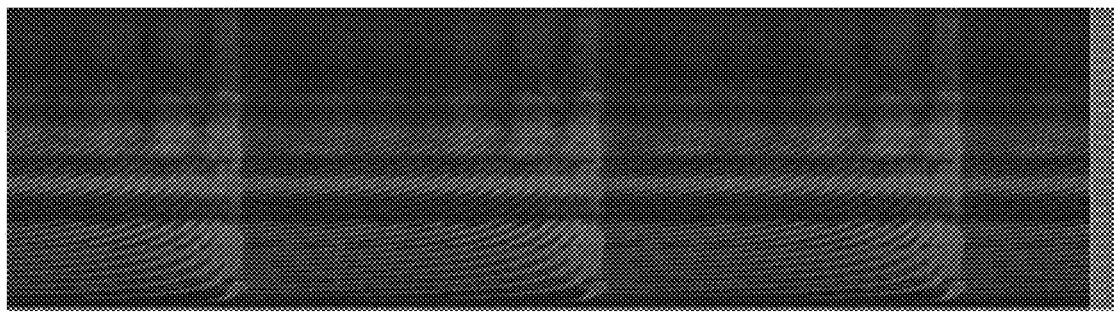
FIG. 7 is a diagram illustrating an example ultrasound output in a sweep pattern.

FIG. 7 is a diagram illustrating an example ultrasound output in a sweep pattern.

The controller 164 may control the sweep mode to output a plurality of killing frequencies at least once during a preset unit time period (e.g., 1 second, 3 seconds, 10 seconds, etc.). The controller 164 may exterminate or repel various types of mosquitoes through the ultrasonic output mode of the sweep pattern as shown in FIG. 7.

The controller 164 may focus on a specific type of mosquito by transmitting a killing frequency for the specific type of mosquito. For example, when the location information is (x1, y1), the controller 164 may output f1 and f2 to focus on each killing frequency. For example, if f1 is the first frequency and f2 is the second frequency, the controller 164 may drive the first ultrasonic vibrator UT1 for outputting the first ultrasonic signal of the first frequency and the second ultrasonic vibrator UT2 for outputting the second ultrasonic signal at least once during the unit time period.

The controller 164 may adjust the output timings of the first ultrasonic signal and the second ultrasonic signal to prevent the first ultrasonic signal and the second ultrasonic signal from being simultaneously output, thereby reducing the interference between the first ultrasonic signal and the second ultrasonic signal.

Figure 8:
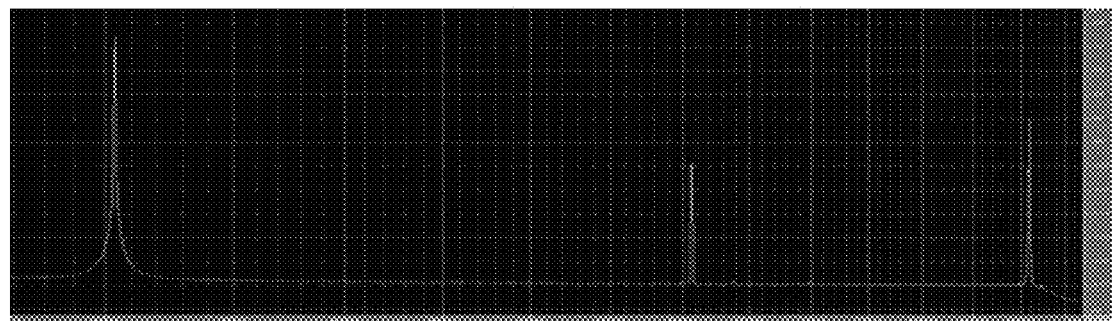
FIG. 8 is a diagram illustrating an example output of ultrasound by a killing pattern.

FIG. 8 is a diagram illustrating an example output of an ultrasound by a killing pattern.

The controller 164 may focus on a specific mosquito through the killing pattern shown in FIG. 8.

Figure 9:
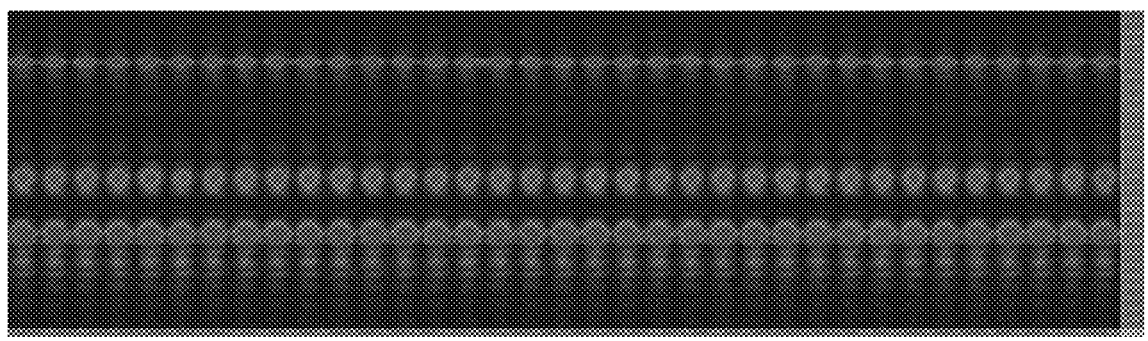
FIG. 9 is a diagram illustrating an example hybrid pattern in which a sweep pattern and a killing pattern are mixed.

FIG. 9 is a diagram illustrating an example hybrid pattern in which a sweep pattern and a killing pattern are mixed.

As shown in FIG. 8, the controller 164 may sweep between the first frequency and the second frequency during the unit time period, and may control the output timings of the ultrasonic signals to output the first frequency and the second frequency alternately.

As shown in FIG. 9, the controller 164 may repel various types mosquitoes while focusing on a specific type of mosquito by mixing the sweep pattern and the killing pattern.

In addition, the ultrasonic vibration pattern according to the location information may be performed based on artificial intelligence. To this end, the controller 164 may include an artificial intelligence (AI) processor. The AI processor may learn the neural network by using a pre-stored program. The neural network for the ultrasonic vibration pattern may be designed to simulate a human brain structure on a computer, and may include a plurality of network nodes having weights that simulate neurons of the human neural network. The plurality of network modes may transmit and receive data according to a connection relationship, respectively, so as to simulate a synaptic activity of a neuron in which a neuron transmits and receives a signal through a synapse. The neural network may include a deep learning model developed from a neural network model. In a deep learning model, a plurality of network nodes may exchange data according to a convolutional connection relationship while being located in different layers. For example, a neural network model may include various deep learning schemes such as a deep neural network (DNN), a convolutional deep neural network (CNN), a recurrent Boltzmann machine (RNN), a restricted Boltzmann machine (RBM), a deep belief network (DBN), a deep Q-network, and the like.

As described above, the controller 164 may perform artificial intelligence learning (e.g., machine learning) by using location information and infestation mosquitoes as input values, and may adjust the output timing of the modulated signal output from the modulator 162 based on the learning result.

Figure 10:
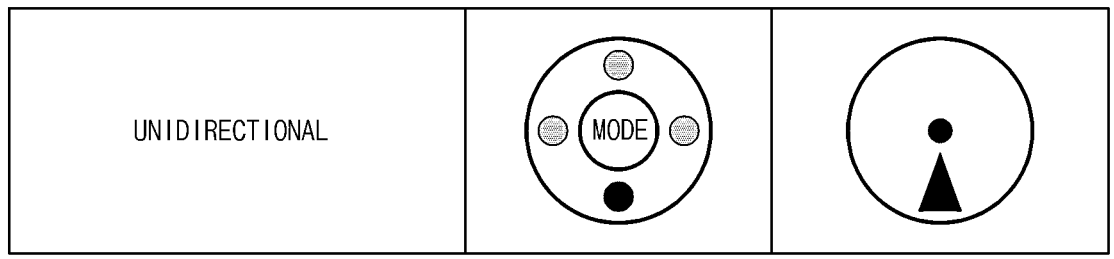
FIGS. 10 and 11 are diagrams illustrating an example of a user input device.
Figure 11:
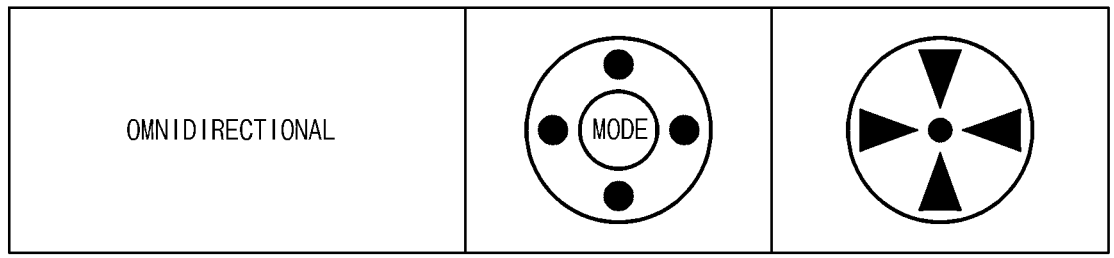

FIGS. 10 and 11 are diagrams illustrating an example of a user input device.

Referring to FIGS. 10 and 11, a user input (e.g., user interface) device UI may be a display including a touch panel, and may be implemented as a display of the vehicle 1 or a user terminal.

As shown in FIG. 10, the user input device UI may display a user interface for a unidirectional mode. The unidirectional mode may refer to a mode in which the ultrasonic vibrator UT transmits ultrasound in one direction while the housing 151 is fixed.

As described in FIG. 11, the user input device UI may display a user interface for an omni-directional mode. In the omnidirectional mode, as shown in FIG. 3, an operation of rotating the housing 151 by using the motor 155 may be performed. In the omni-directional mode, because the ultrasonic vibrator UT transmits ultrasound while the housing 151 is rotated by the motor 155, the ultrasound transmitter 150 may transmit ultrasound in 360° direction.

An ultrasound generator may be designed to increase the directivity of the ultrasound of the ultrasonic vibrator transmitted by the ultrasound transmitter 150 based on the omni-directional mode.

FIGS. 12A, 12B, 12C, 12D are diagrams illustrating a main lobe of an example ultrasonic signal according to directivity.

Figure 12A:
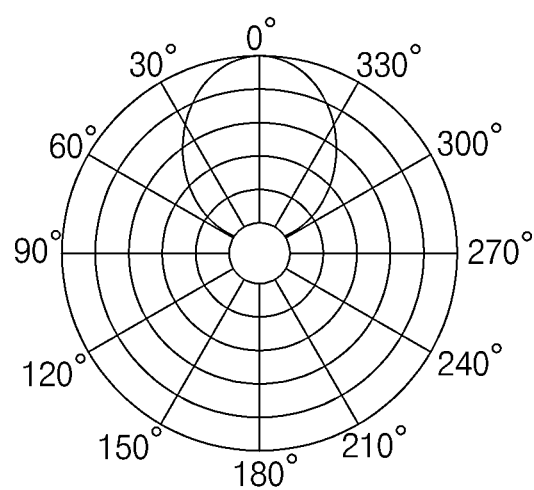
FIGS. 12A, 12B, 12C, and 12D are diagrams illustrating a main lobe of an example ultrasonic signal according to directivity.
Figure 12B:
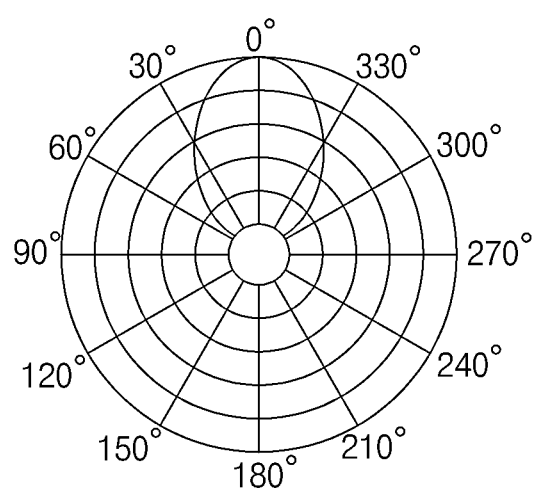
Figure 12C:
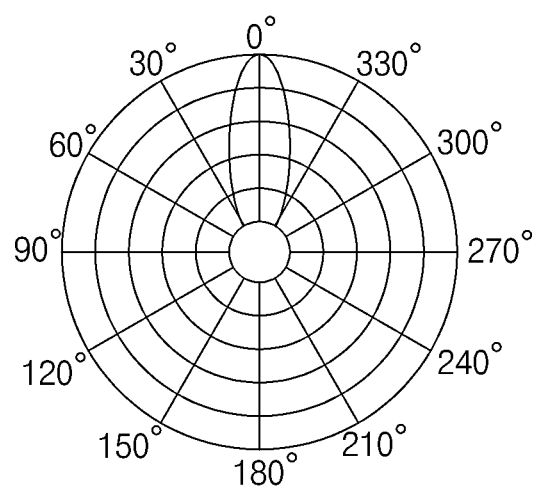
Figure 12D:
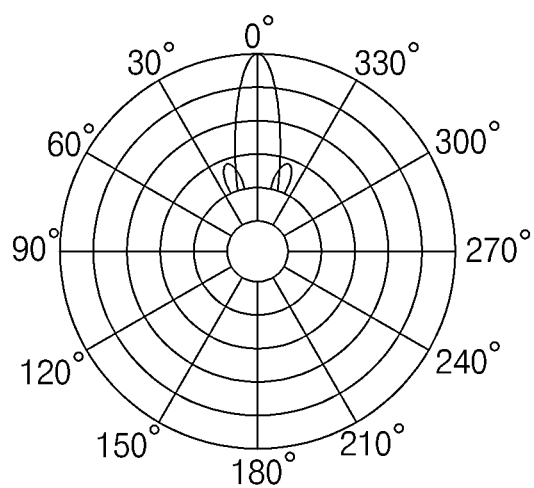

FIG. 12A shows the main lobe of a first ultrasonic signal.
FIG. 12B shows the main lobe of a second ultrasonic signal.
FIG. 12C shows the main lobe of a third ultrasonic signal.
FIG. 12D shows the main lobe of a fourth ultrasonic signal.
FIGS. 12A, 12B, 12C, and 12D illustrate an embodiment in which the directivity of the fourth ultrasonic signal is the greatest, the directivity of the third ultrasonic signal is the second greatest and the directivity of the first ultrasonic signal is the smallest.

Because it is possible to transmit an ultrasonic signal to a greater distance as the directivity of the ultrasonic signal is greater, it is possible to exterminate or repel mosquitoes that are farther away. However, because the width of the main lobe decreases as the directivity of the ultrasonic signal increases, the width (e.g., angular distance) capable of exterminating or repelling mosquitoes may decrease. According to an embodiment of the present disclosure, as shown in FIGS. 10 and 11, mosquitoes may be exterminated or repelled in all directions according to the rotation of the motor 155 rather than in a specific direction by the omnidirectional mode operation.

Figure 13:
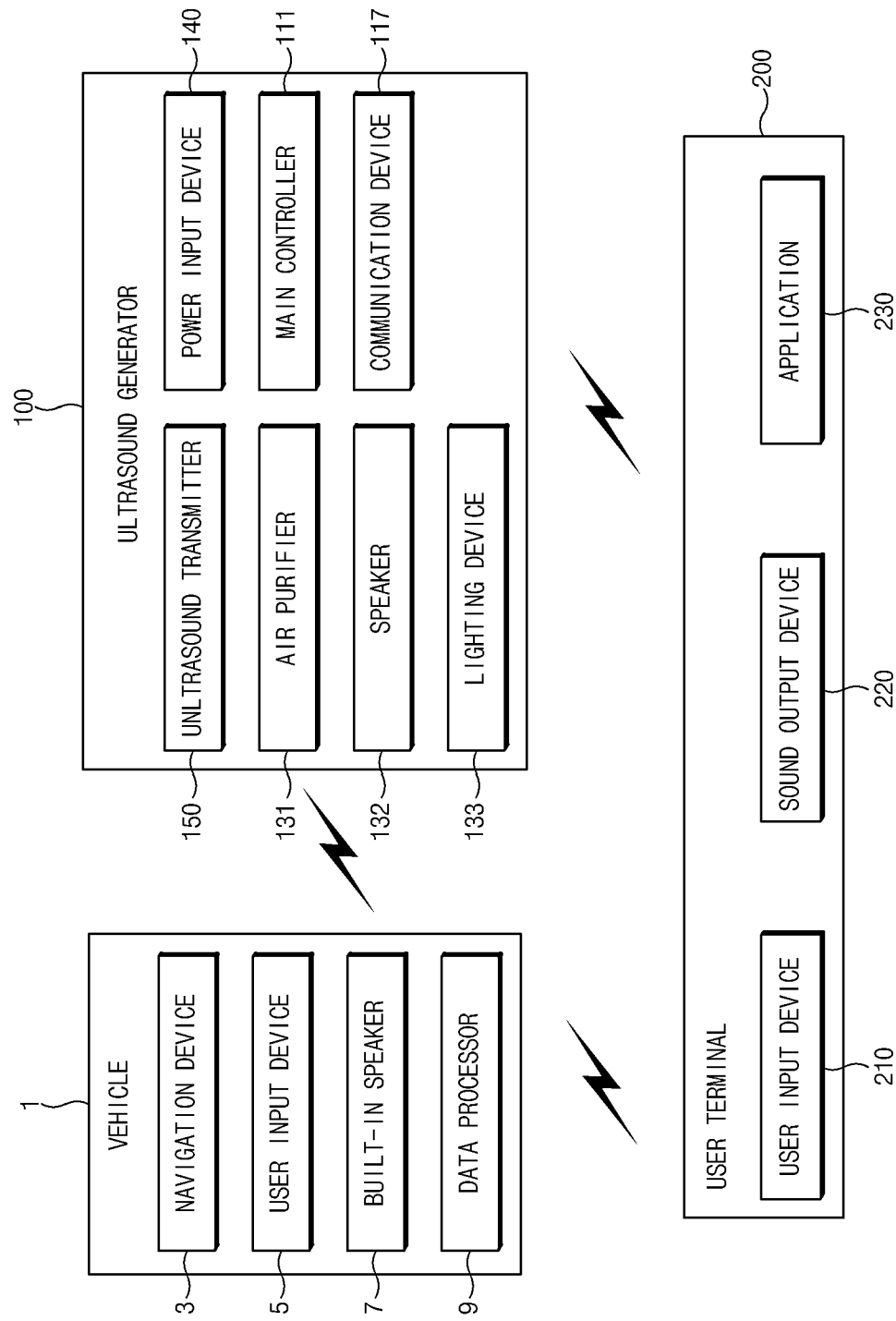
FIG. 13 is a diagram illustrating an example mosquito extermination or repellent system using an ultrasound generator.

FIG. 13 is a diagram illustrating an example mosquito extermination or repellent system using an ultrasound generator.

Referring to FIG. 13, a mosquito extermination or repellent system in a vehicle using the ultrasound generator may include the ultrasound generator 100 implemented in the form of a portable multifunction device, the vehicle 1, and a user terminal 200.

The ultrasound generator 100 may include the ultrasound transmitter 150, an air purifier 131, a speaker 132, a lighting device (e.g., a lamp, a flashlight, etc.) 133, the power input device 140, and a main controller 111.

The ultrasound transmitter 150 may be implemented based on the embodiments shown in FIGS. 2 and 3.

The air purifier 131 may filter out fine dust or bacteria by suctioning air, and discharging purified air. The air purifier 131 may be arranged on the multi-device 130 or the main frame 110 shown in FIG. 2.

The speaker 132 may output a sound source signal (e.g., sound signal) having an audible frequency while the ultrasonic vibrator UT transmits an ultrasonic signal. The speaker 132 may be arranged on the multi-device 130 or the main frame 110 shown in FIG. 2.

The lighting device 133 may be formed using a plurality of light emitting diodes (LEDs) arranged on the multi-device 130 or the main frame 110.

The power input device 140, which is provided to receive power from an external power source, may be formed in a type of a plug for receiving direct current (DC) voltage or include a USB socket to which a USB cable is connected.

A communication module 117 may communicate with the vehicle 1 or the user terminal 200 through a short-range wireless communication protocol such as Bluetooth.

Alternatively, the communication module 117 may communicate with the vehicle 1 or the user terminal 200 through an external server by using technical standards or communication schemes for mobile communication. Technical standards for communication may include global system for mobile communication (GSM), code division multi-access (CDMA), code division multi-access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), and the like.

The vehicle 1 may include a navigation device 3, a user input device 5, a built-in speaker 7, and a data processor 9.

The navigation device 3 of the AVN device may guide a destination based on vehicle location information and map data. The navigation device 3 may obtain location information based on GPS.

The user input device 5 may receive a user input for controlling the AVN device of the vehicle, and in particular, may receive a user input for controlling the ultrasound generator 100. The user input device 5 may be implemented with the display 51 of the AVN device.

The built-in speaker 7 may transmit a sound source connected to a radio or vehicle. In particular, the built-in speaker 7 may transmit an emotional sound source having an audible frequency while the ultrasound transmitter 150 transmits ultrasound.

Figure 14:
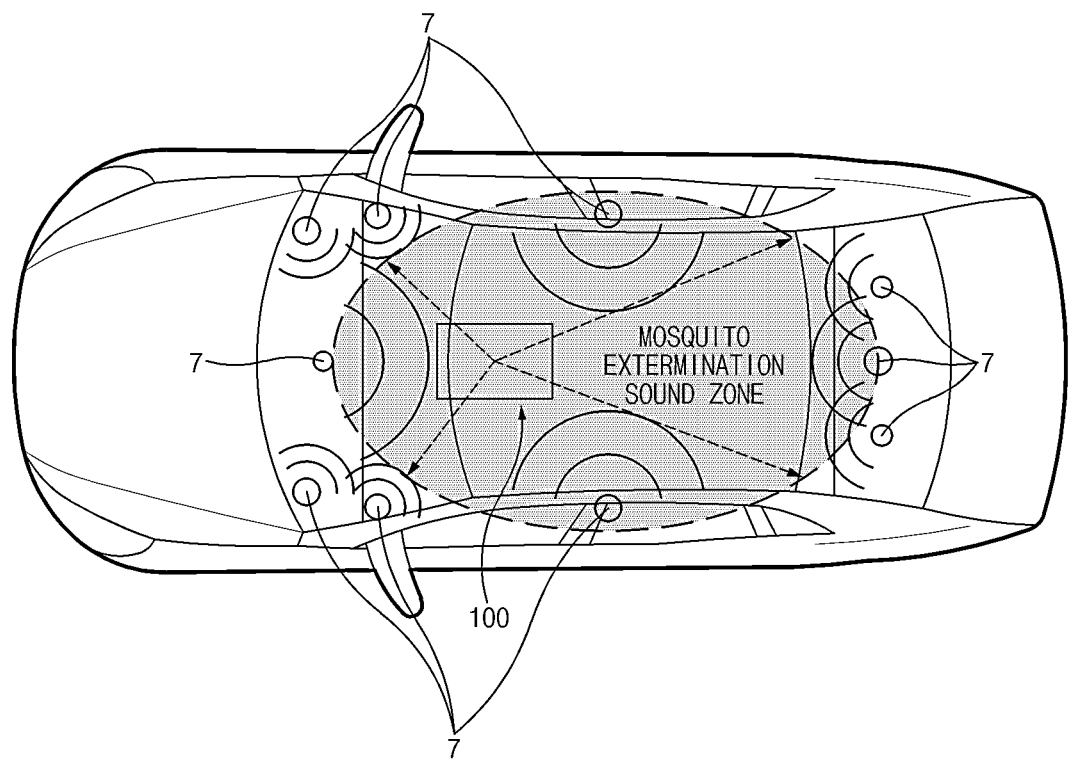
FIG. 14 is a diagram illustrating an example of transmitting an emotional sound source through a built-in speaker.

FIG. 14 is a diagram illustrating an example of transmitting an emotional sound source through a built-in speaker. As shown in FIG. 14, while the ultrasound transmitter 150 transmits ultrasound, the built-in speakers 7 may transmit an emotional sound source. By transmitting the emotional sound source, it is possible to provide a psychologically stable (e.g., relaxing) sound to the user while notifying the user of the operation of the mosquito extermination and repelling function.

The data processor 9 may control the AVN device and may generate a control signal for controlling the ultrasound generator 100 and the built-in speaker 7 according to a user input. The data processor 9 may obtain location information through the navigation device 3, and may retrieve the type of mosquitoes infesting the area in which the vehicle 1 is located based on the location information. To this end, the data processor 9 may search a database in which the location information and the types of infestation mosquitoes are matched.

In addition, the data processor 9 may adjust the pattern of the ultrasonic output according to the type of mosquito.

The data processor 9 may search for the type of mosquito corresponding to the location information, and check a killing frequency matching the type of mosquito. The data processor 9 may control the ultrasonic output to output the killing frequencies.

If there are a plurality of killing frequencies, the data processor 9 may control ultrasonic vibrators that output the killing frequencies, respectively.

When the killing frequency for exterminating or repelling infestation mosquitoes corresponding to the location information is not set (e.g., defined, specified, etc.), or when the number of types of infestation mosquitoes corresponding to the location information exceeds a threshold value, the data processor 9 may control the ultrasonic output in the sweep pattern.

The user terminal 200 may be a portable terminal such as a smartphone or a tablet, and may include a user input device 210 and a sound output device 220.

The user input device 210 may receive an input for overall control of the user terminal 200, and in particular, may receive a user input for controlling the ultrasound generator 100 according to an embodiment of the present disclosure.

The sound output device 220 may transmit an emotional sound source having an audible frequency while the ultrasound transmitter 150 transmits the ultrasound. The emotional sound source may be preset, and the ultrasound transmitter 150 may notify an operation of exterminating or repelling mosquitoes through ultrasonic transmission.

The user terminal 200 may be equipped with an application 230 associated with the ultrasound generator 100. The application 230 may generate a control signal for controlling the ultrasound generator 100 based on a user input, and may provide the control signal to the ultrasound generator 100 through a communication device. In addition, the application 230 may control the sound output device 220 to transmit an emotional sound source.

Figure 15:
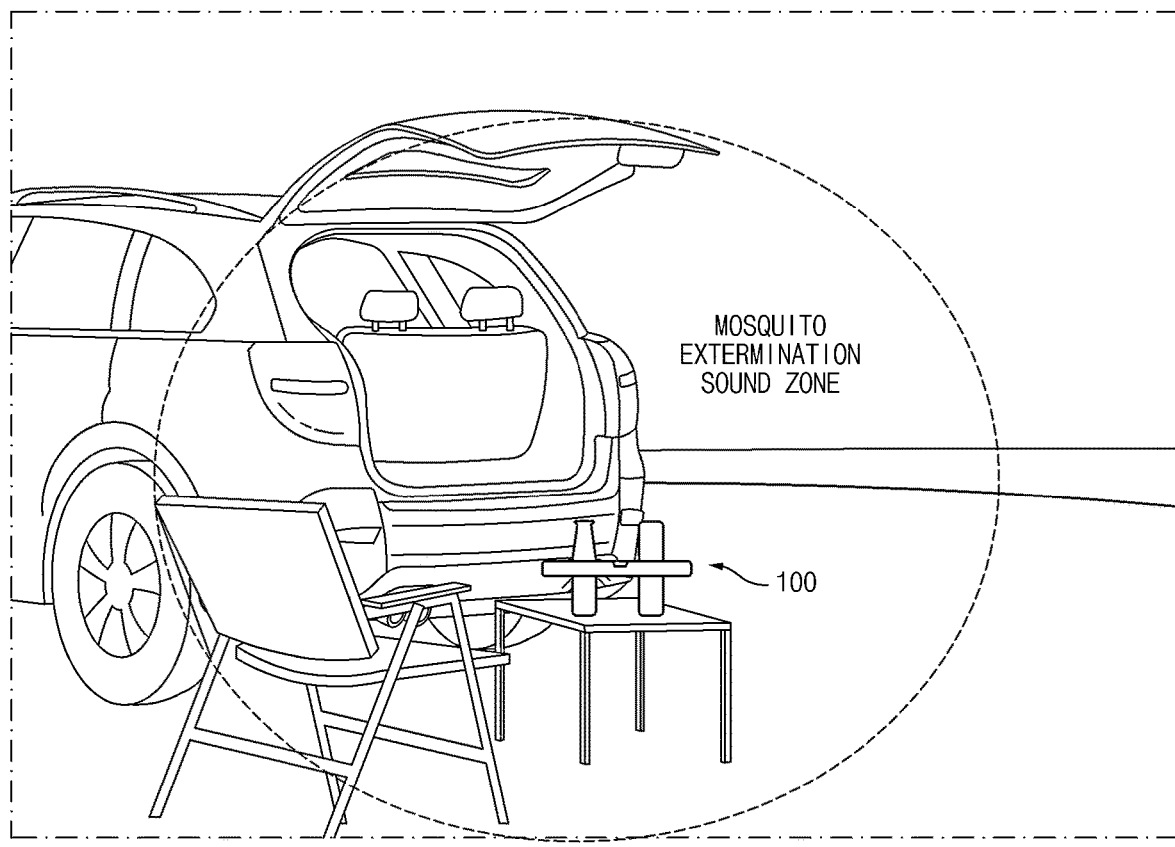
FIG. 15 is a diagram illustrating an example mosquito extermination or repellent system through vehicle linkage.

FIG. 15 is a diagram illustrating an example mosquito extermination or repellent system through vehicle linkage.

Referring to FIG. 15, the ultrasound generator 100 may be controlled by using the user terminal 200 or the vehicle 1 through short-range wireless communication.

In addition, because the ultrasound generator 100 may be portable, the ultrasound generator 100 may be deployed outside the vehicle 1. In particular, because the ultrasound generator 100 may transmit ultrasound in all directions, and not necessarily in a specified direction, in a state in which the ultrasound generator 100 is deployed outside the vehicle 1, it is possible to exterminate or repel mosquitoes approaching from the interior and exterior areas of the vehicle 1.

In addition, because the ultrasound generator 100 may exterminate or repel mosquitoes in all directions while increasing the straightness (e.g., linear range), it may be more advantageous to deploy the ultrasound generator 100 at an outside of the vehicle in connection with the vehicle.

In addition, because the ultrasound generator 100 may change the ultrasonic pattern according to the types of mosquito infestations in the area, it is possible to increase the effectiveness of mosquito extermination or repelling according to the area in which the vehicle 1 is located rather than a fixed area.

As described above, the ultrasound generator 100 may be connected to the vehicle 1 and is advantageous to be utilized outside of the vehicle 1, it is possible to effectively exterminate or repel during camping using the vehicle 1.

Figure 16:
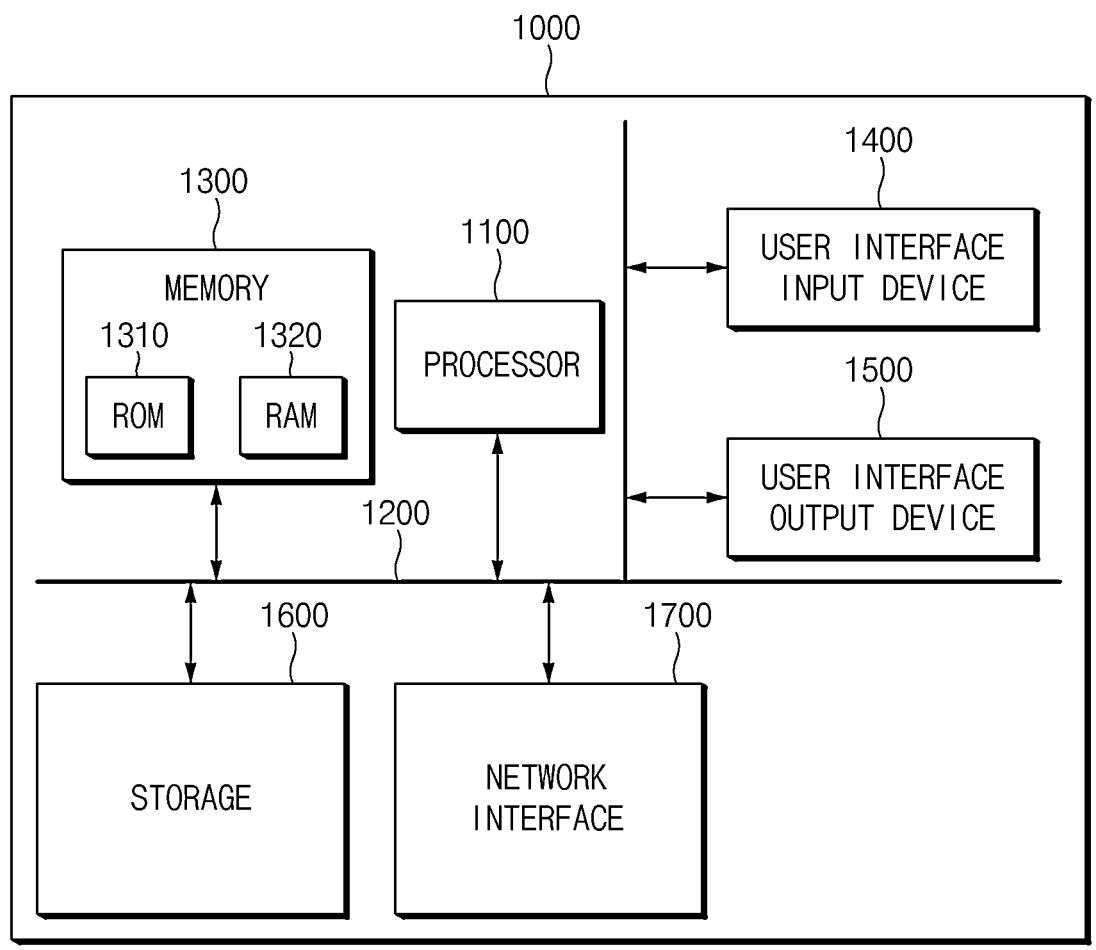
FIG. 16 is a diagram illustrating an example computing system.

FIG. 16 is a diagram illustrating an example computing system.

Referring to FIG. 16, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. In particular, the processor 1100 may generate a control signal for controlling the ultrasound generator 100. The memory 1300 and the storage (e.g., data storage) 1600 may include various types of volatile or non-volatile storage media. For example, the memory 1300 may include a read-only memory (ROM) 1310 and a random access memory (RAM) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an erasable programmable read-only memory (EPROM), an electrically erasable programmable read-only memory (EEPROM), a register, a hard disk, solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

By using the rotation of the housing coupled to the ultrasonic vibrator, it may be possible to exterminate or repel mosquitoes in a wide area while reducing the number of ultrasonic vibrators.

In addition, according to the embodiments of the present disclosure, it is possible to modulate the amplitude of the driving signal and increase the directivity of the ultrasound, thereby increasing the mosquito extermination or repellent performance.

In addition, according to the embodiments of the present disclosure, various types of mosquitoes may be exterminated or repelled because a frequency is selected corresponding to infestation mosquitoes based on location information.

In addition, according to the embodiments of the present disclosure, by adjusting the pattern of the ultrasonic output, it is possible to increase the mosquito extermination or repellent performance.

In addition, the embodiments of the present disclosure provide an ultrasonic generator capable of exterminating or repelling various types of mosquitoes, a pest extermination or repellent system using the ultrasonic generator, and a method of controlling the ultrasonic generator.

In addition, various effects that are directly or indirectly understood through the present disclosure may be provided.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An ultrasound generator comprising:
a driving signal generator configured to generate a driving signal;
a modulator configured to generate a modulated signal by modulating an amplitude of the driving signal;
a first ultrasonic vibrator configured to generate a first ultrasonic signal, having a first frequency, based on the modulated signal;
a second ultrasonic vibrator configured to generate a second ultrasonic signal, having a second frequency, based on the modulated signal; and
a controller configured to adjust an output timing of the modulated signal to output the first ultrasonic signal or the second ultrasonic signal at least once during a unit time period,
wherein the first frequency and the second frequency are set so that the first ultrasonic signal and the second ultrasonic signal repel different types of pests, and
wherein the controller is further configured to:
determine a type of mosquito infestation based on location information, and
adjust the output timing of the modulated signal to output an ultrasonic signal having a third frequency to repel the determined type of mosquito infestation.

2. The ultrasound generator of claim 1, wherein the modulator is configured to generate the modulated signal via at least one of single sideband modulation or double sideband modulation.

3. The ultrasound generator of claim 1, wherein the controller is configured to adjust the output timing of the modulated signal based on a machine learning process using, as input values, location information and a type of mosquito infestation.

4. The ultrasound generator of claim 1, wherein the controller is configured to control the first ultrasonic vibrator to prevent, during the unit time period, an output time period of the first ultrasonic signal of the first frequency from overlapping with an output time period of the second ultrasonic signal of the second frequency.

5. The ultrasound generator of claim 1, wherein the controller is configured to adjust the output timing of the modulated signal to sweep between the first frequency and the second frequency during the unit time period.

6. The ultrasound generator of claim 1, wherein the controller is configured to adjust the output timing of the modulated signal to output the first ultrasonic signal and the second ultrasonic signal to sweep between the first frequency and the second frequency during the unit time period while alternately outputting the first frequency and the second frequency.

7. The ultrasound generator of claim 1, wherein the first ultrasonic vibrator and the second ultrasonic vibrator are implemented in a super directional speaker.

8. The ultrasound generator of claim 1, further comprising:
a housing to which the first ultrasonic vibrator and the second ultrasonic vibrator are coupled; and
a motor configured to rotate the housing.

9. The ultrasound generator of claim 8, further comprising:
a main frame configured to support the housing; and
a support protruding from the main frame to be seated in a cup holder of a vehicle.

10. The ultrasound generator of claim 1, further comprising:
an amplifier configured to amplify an amplitude of the modulated signal.

11. A pest repellent system comprising:
a first ultrasonic vibrator configured to generate a first ultrasonic signal having a first frequency during a unit time period;
a second ultrasonic vibrator configured to generate a second ultrasonic signal having a second frequency during the unit time period;
a controller configured to control output timings of the first ultrasonic signal and the second ultrasonic signal output from the first ultrasonic vibrator and the second ultrasonic vibrator; and
a speaker, coupled to a vehicle, to transmit a sound signal having a preset audible frequency while the first ultrasonic vibrator and the second ultrasonic vibrator output the first ultrasonic signal and the second ultrasonic signal under control of the controller,
wherein the first frequency and the second frequency are set so that the first ultrasonic signal and the second ultrasonic signal repel different types of pests, and
wherein the controller is configured to control the output timings of the first ultrasonic signal and the second ultrasonic signal to exterminate or repel pests based on location information associated with the vehicle.

12. The pest repellent system of claim 11, wherein the first ultrasonic vibrator and the second ultrasonic vibrator are implemented in a super directional speaker.

13. The pest repellent system of claim 11, further comprising:
a housing to which the first ultrasonic vibrator and the second ultrasonic vibrator are coupled; and a motor configured to rotate the housing.

14. The pest repellent system of claim 13, further comprising:
- a main frame configured to support the housing; and
- a support protruding from the main frame to be seated in a cup holder of the vehicle.

15. A method comprising:
- generating modulated signals by modulating driving signals having different frequencies;
- adjusting output timings of the modulated signals to include an output time period of each of the driving signals at least once during a unit time period; and
- generating, based on the modulated signals and based on the output timings, a first ultrasonic signal having a first frequency and a second ultrasonic signal having a second frequency; and
- controlling, based on location information associated with an ultrasonic vibrator, the output timings,
- wherein the first frequency and the second frequency are set so that the first ultrasonic signal and the second ultrasonic signal repel different types of pests.

16. The method of claim 15, wherein the generating of the modulated signals comprises:
- using at least one of single sideband modulation or double sideband modulation.

17. The method of claim 15, wherein the adjusting of the output timings of the modulated signals comprises:
- adjusting the output timings of the modulated signals to sweep between the first frequency and the second frequency during the unit time period while alternately outputting the first frequency and the second frequency.

* * * * *